Oct. 9, 1928.
R. G. DATSON
STENOGAUGE
Filed April 23, 1925
1,687,429
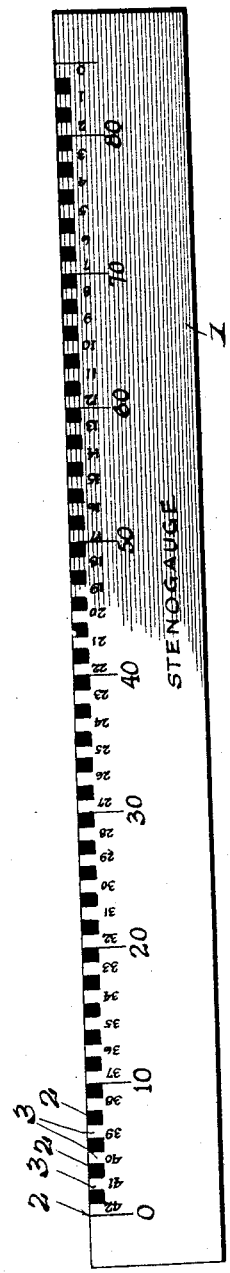
WITNESSES
INVENTOR
R. G. Datson.
BY
ATTORNEYS Patented Oct. 9, 1928.

1,687,429

UNITED STATES PATENT OFFICE.

ROY G. DATSON, OF CHICHAGOFF, TERRITORY OF ALASKA.

STENOGAUGE.

Application filed April 23, 1925. Serial No 25,428.

My invention relates generally to devices for the use of stenographers and typists to ascertain the position of the carriage of a typewriter at the beginning of the operation of writing a caption or other matter by means of the typewriter, whereby the written matter will be centered on the sheet of paper on which such matter appears.

An object of the invention is the provision of a device of the character described which is simple in construction and is formed in one piece and which can be used with a typewriter of conventional construction to indicate quickly and accurately the position of the carriage of the typewriter at the beginning of the operation of writing a caption or other matter of any given length less than that of a full line of typewritten matter so that the typewritten matter will be centered on the sheet of paper on which it is produced.

Other objects and advantages of the invention will be apparent from the following description, considered in conjunction with the accompanying drawing, in which—

The figure is a plan view of a gauge embodying the invention.

In carrying out the invention I may make use of an elongated substantially flat body or strip 1. A longitudinally extending series of graduations are produced on the body of the strip 1 preferably along one edge thereof. The longitudinal median lines of the respective graduations are spaced apart regularly throughout the length of the series. These graduations may be considered as comprising a scale, the unit of which is "1". This unit and therefore the distance between the median lines of adjacent graduations represents the distance that the carriage of a typewriter of ordinary construction will move each time the spacer bar or a character bar of the typewriter is actuated. The aforesaid scale is shown in the drawing as comprising 85 graduations. The first graduation at the left hand end of the scale is designated by the large heavy black character "0". The values of the graduations of the scale then increase toward the right hand end of the scale and the graduations having a value of "10" or a multiple thereof, after the aforesaid graduation "0" at the left hand end of the scale, are indicated in the figure of the drawings as having black characters or numbers which indicate their respective values in the scale.

Alternating graduations of the aforesaid scale on the body 1 are colored or otherwise marked so that adjacent graduations are distinguished from one another, as by producing the first graduation at the left hand end of the scale and every second graduation thereafter in black as indicated at 2 and by producing the remaining graduations in some other color, as for example in red, as indicated by the white or blank spaces at 3 in the drawing. It will be noted that the hereinbefore mentioned heavy black numbers are applied to the graduations 2. The graduations 3 not only serve as graduations of the aforesaid scale but in addition may be considered as comprising a second scale, the values of the graduations of which increase from the right hand end of the scale. In other words, the graduation of the first named or primary scale which is located at the right hand end of that scale and which has the highest value of the first named scale is the first graduation and has the lowest value of the graduations of the second named or secondary scale. The graduations 3 have the values indicated by the relatively small numbers "0" to "42" inclusive, the unit of the second named or secondary scale also being "1" but the value of this unit being twice that of the unit of the first mentioned scale. The unit of the second named or secondary scale has a value representing twice the distance the carriage of the aforesaid typewriter will move each time the spacer bar or the character bar of the typewriter is operated.

The body 1 may be made of wood, metal, celluloid or any other suitable material and it may be used on a typewriter in the place of the usual scale strip of the typewriter or may be a member separate from the typewriter with which it is to be used. Also, it will be understood that the graduations on the body 1 and the characters which are applied thereto may be produced on the body 1 in any suitable known manner and in any suitable color or colors, it only being essential that the graduations of the secondary scale shall be readily distinguishable from the remaining graduations and that the graduations of the second named scale shall alternate with the remaining graduations on the body 1 to form the first named or primary scale.

From the foregoing description of the various parts of the device, the operation thereof may be readily understood. It is essential that the number of letters, characters and spaces which will be in the caption or other matter that is to be typewritten be known. Therefore, the captions or other matter may be typewritten on a sheet of paper without regard to the positions of such captions or other matter on the sheet. This sheet then will constitute what I term a "dummy sheet." The paper guide on the typewriter is set so that the left hand edge of the paper will be in the position indicated by the "0" of the typewriter scale. The number of letters, characters and spaces in a caption or other matter then is determined. Let us assume that such number is "15." It may be noted at this point that the number of letters, characters and spaces in the caption or other matter on the dummy sheet can be ascertained at a glance merely by placing the gauge so that the first letter or character of the caption or other matter is in line with the first graduation of the primary or first named scale of the gauge. The last character or letter of the caption or other matter then will be in line with the graduation of the first named scale which indicates the number of letters, characters and spaces in the caption or other matter and will be either exactly or substantially in line with the graduation of the second named or secondary scale which indicates the character or graduation of the typewriter scale at which the indicator of the carriage of the typewriter should be set.

In other words, should the number of letters, characters and spaces in a given caption be 15, the indicated graduation of the secondary scale of the device will be 35 and the number 35 therefore indicates the starting point on the scale of the typewriter when it is desired to typewrite a caption having 15 letters, characters and spaces on a sheet of paper so that such caption will be spaced equi-distant from the side edges of the sheet of paper. In the event that the last letter, or character of a caption or like matter is not exactly in line with a graduation on the second named scale of the device when a device is placed on the dummy sheet so that the first graduation of the primary scale is in line with the first letter or character of the caption or like matter, the graduation of the secondary scale which is nearest to the letter or character at the end of the caption or like matter is taken as representing the starting point on the scale of the typewriter.

If tabulating is to be done, place the gauge on the dummy sheet so that the 0 graduation of the first named scale will be in line with the first letter or character of the first sum or word of the matter of a line of a table. The last letter, figure or other character of that line of matter then will indicate a graduation of the second named scale. Let us assume that this graduation of the second named scale is 16. The gauge now is moved on the dummy sheet so that the graduation 16 of the first named scale of the gauge is in line with the first letter or figure of the first amount or word of the line and the points on the typewriter scale at which the tabulator stops should be set then will be indicated on the first named gauge.

If it is desired that the captions or other matter shall be disposed at one side of the vertical median line of the sheet, the paper guide of the typewriter is moved as required to shift the spacing of the captions or other matter on the sheet and the gauge is then used as above described.

If not convenient to make a dummy sheet as above described, the letters, characters and spaces of a caption or other matter may be counted on the gauge, starting with the 0 graduation of the first named scale and the graduation of the secondary scale either exactly in line or substantially in line with the last letter or other character or space which has been counted will indicate the starting point on the typewriter scale.

Obviously, my invention is susceptible of embodiment in forms other than that illustrated in the accompanying drawing and I therefore consider as my own all such modifications and adaptations of the forms of the device herein described as fairly fall within the scope of the appended claim.

I claim:—

A typewriter gauge for determining the position of the typewriter carriage for centering a caption or the like upon a sheet of paper comprising a strip with a scale along one edge thereof comprising alternate blanks of distinguishable colors, each blank corresponding to the space the carriage of a typewriter moves when the spacer bar or character bar is operated, and two rows of numerals upon the scale, one row being placed under the other, the rows extending parallel to said scale, and one row comprising consecutive numbers arranged adjacent alternate blanks and representing divisions, each of which constitutes two space movements of a typewriter carriage, and the lower row comprising graduations constituting numbers having a value of ten or the multiple thereof.

ROY G. DATSON.